UNITED STATES PATENT OFFICE.

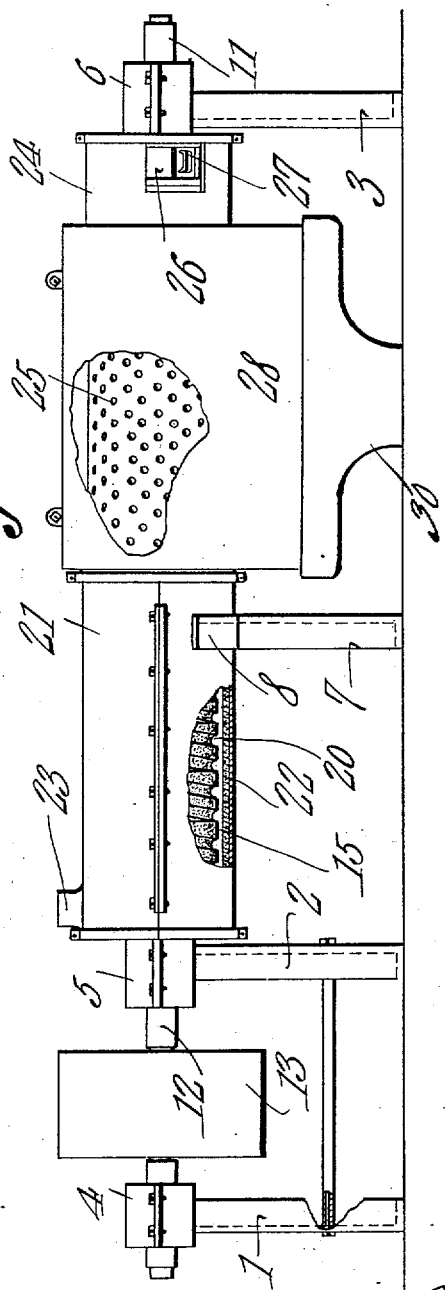

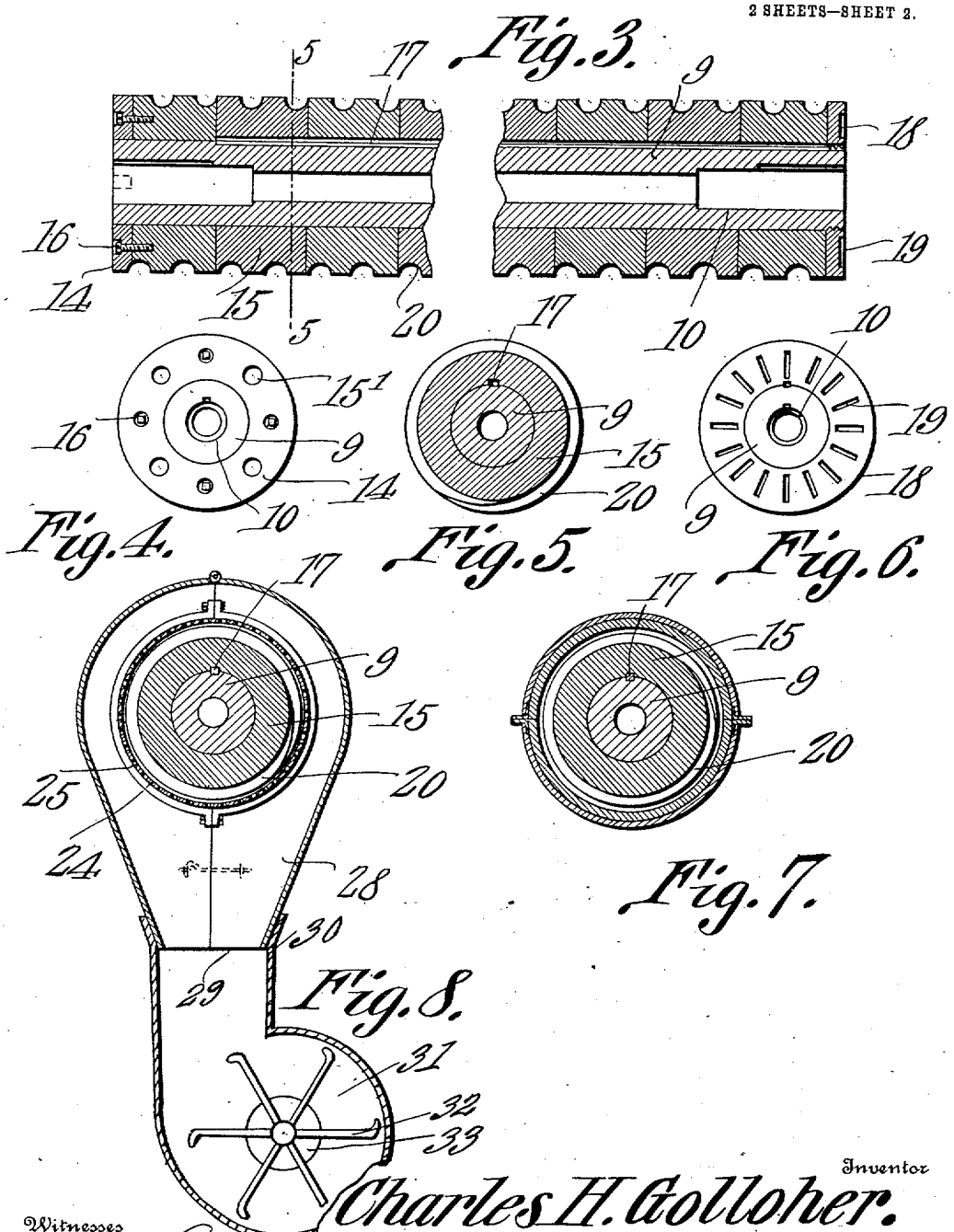

CHARLES H. GOLLOHER, OF GLOSTER, MISSISSIPPI.

COTTON-SEED DELINTER.

1,019,955.       Specification of Letters Patent.     Patented Mar. 12, 1912.

Application filed February 23, 1910. Serial No. 545,478.

*To all whom it may concern:*

Be it known that I, CHARLES H. GOLLOHER, a citizen of the United States, residing at Gloster, in the county of Amite and State of Mississippi, have invented a new and useful Cotton-Seed Delinter, of which the following is a specification.

This invention has relation to cotton seed delinters and it consists in the novel construction and arrangement of its parts as hereinafter shown and described.

The object of the invention is to provide a simple and effective apparatus for removing the lint from cotton seed without injury to the same and to provide means for separating the lint from the seed and recovering the lint.

With the above objects in view the apparatus includes a casing having an entrance portion lined with an abrading material and an exit portion provided with a number of minute perforations. A rotor is journaled in the casing and is made up of a series of disks, of abrading material mounted upon a hollow shaft.

By so assembling the parts of the apparatus it will be seen as explained hereinafter more fully that the seed is denuded of the lint or the major portion of the lint in the entrance portion of the casing by the co-action of the rotor and the abrading material in the said portion of the casing, and that the separation of the lint from the seed is accomplished in the exit portion of the casing and whatever particles of lint that might remain upon the seeds are removed therefrom by the rotor. Furthermore the accumulation of seed and lint in the exit portion of the casing will serve to retard the passage of the seed through the entrance portion of the casing and consequently the seed is held in the said entrance portion for a sufficient length of time to enable the abrading material to properly operate upon the same.

In the accompanying drawings:—Figure 1 is a side elevation of the delinter with parts broken away and parts in section. Fig. 2 is a top plan view of the delinter. Fig. 3 is a longitudinal sectional view of the rotor of the delinter. Fig. 4 is an end view of the rotor. Fig. 5 is a transverse sectional view of the rotor cut on the line 5—5 of Fig. 3. Fig. 6 is an end view of the rotor viewing the same from the opposite end to that shown in Fig. 4. Fig. 7 is a transverse sectional view of the rotor and casing. Fig. 8 is a transverse sectional view through the rotor, casing and a hood over the exit portions thereof, a sectional view of the suction fan spout generally located in the floor below the delinter being shown in operative relation thereto.

The apparatus includes standards 1, 2 and 3 having at their upper ends bearings 4, 5 and 6 respectively. A standard 7 is also provided and the upper end of the said standard 7 is fashioned into a saddle 8 which serves in part as a support for a casing to be described presently.

A rotor forms a component part of the apparatus and consists of a hollow shaft 9 having its end portions counter-bored as at 10. Gudgeons 11 and 12 are fixed in the counter-bored end portion 10 of the shaft 9 and the gudgeon 11 is journaled in the bearing 6 while the gudgeon 12 is journaled in the bearings 4 and 5. A belt pulley 13 is fixed to the gudgeon 12 and is located between the standards 1 and 2. A circular plate 14 is fixed to one end of the shaft 9 and is provided at diametrically opposite side portions with recesses 15' in which relatively heavy material as for instance Babbit metal or lead may be packed to counter-balance the rotor upon its axis.

A series of disks 15 is strung upon the shaft 9 and that disk adjacent the plate 14 is fixed to the said plate by means of bolts 16 which pass transversely through the plate and enter the side portion of the said disk. The remaining disks of the series are restrained against rotation upon the shaft 9 by means of a key 17 which lies in the slot provided in the said disks and the periphery of the shaft 9 in the usual manner. A plate 18 is screwed upon the opposite end of the shaft 9 from that end at which the plate 14 is mounted and bears against the final disk 15 of the series and serves as means for clamping said disks together. The plate 18 is provided with a series of radially disposed grooves 19 in which relatively heavy material as for instance lead or Babbit metal may be packed to counter-balance the rotor upon its axis as above referred to. The disks 15 are provided upon their peripheries with spiral grooves 20 and when the disks are assembled as indicated the ends of the groove upon one disk register with the end of the grooves on adjacent disks so that a continuous spiral groove extends throughout the length of the rotor.

The casing is cylindrical in form and consists of an entrance portion 21 which is lined upon its inner surface with an abrading material 22 of corundum or similar material. The inner surface of the abrading material is smooth and said material is preferably formed in sections which are fitted together in the entrance portion 21 in an appropriate manner. The entrance portion 21 is provided at its top side and at its front end with an inlet opening 23. The casing also includes an exit portion 24 which joins at one end with one end of the entrance portion 21 and the said portion 24 is provided with a number of minute perforations 25. The portion 24 is provided in its side and at its delivery end with an outlet 26 over which a slidable gate 27 is adapted to operate. A hood 28 is located over the perforated portion of the casing portion 24 and is provided with a downwardly disposed outlet 29 and a suction means 30 which fits over the outlet end 29 and is disposed below the floor supporting the delinting machine, the mouth thereof sliding over the outlet 29 of the hood 28, and being provided with the suction fan casing 31, fan 32 and the final outlet 33, whereby the lint may be removed from the delinter. The peripheries of the disks 15 are appropriately spaced from the inner surface of the abrading material 22 and the inner surface of the casing portion 24.

In operation the rotor is rapidly revolved by power applied to the belt pulley 13 in any appropriate manner and lint bearing cotton seed is passed through the inlet 23 into the entrance portion 21 of the casing. As the seed passes through the said portion 21 it is subjected to the co-action of the abrading material 22 and the disks 15 and the major portion of the lint is torn from the pericarp of the seed. The mixed seed and lint passes from the portion 21 into the portion 24 of the casing and the particles of lint sift or are drawn through the perforations 25 into the hood 28. During the time that the lint is being separated from the seed while in the casing portion 24 the seed is subjected to a further abrading action by those disks 15 which are located in the said portion 24 of the casing and the seed is completely denuded of the lint. These particles of lint are also sifted or drawn through the perforations 25 and enter the hood 28, and finally carried to the suction fan casing 31 and through the opening 33 to the proper receptacle. As the seed approaches the delivery end of the casing portion 24 it is elevated by the action of the rotor and passes out through the outlet 26.

By adjusting the gate 27 over the outlet 26 the height to which the seed is elevated before it is ejected from the apparatus may be regulated so that the seed may exercise the proper back pressure upon the seed in the casing portion 21 to retard the passage of the seed through the said portion 21 and thus enable the disks and abrading material 22 to properly operate upon the said seed while in the said portion of the casing.

The intermediate portion of the casing rests in the saddle 8 formed in the upper end of the standard 7 and the said casing is preferably made from sheet iron sections of which are joined together in any desired manner.

Having thus described my invention, what I claim as new and desire to secure by Letters Patent is:—

1. A delinter, having a stationary cylindrical scouring shell, the forward portion of which is provided with an inlet and is imperforate, and the rear portion of which is perforated circumferentially, the imperforate portion of the shell having an abrasive lining, a lint receiving chamber surrounding only the perforated end of the shell, and a rotating scouring shell disposed within the stationary shell the full length thereof.

2. A delinter, having a stationary cylindrical scouring shell, said scouring shell being divided equally into a forward imperforated portion and a rear perforated portion, an abrasive lining for the imperforate portion of the shell, a lint receiving chamber surrounding the perforated portion of the shell, and into which said perforations enter, a rotating shell disposed longitudinally within the entire cylindrical scouring shell, and a spiral abrasive surface carried thereby.

3. A delinter having a stationary cylindrical scouring shell, said shell being provided with seed inlet and outlet ends, said shell being further provided with two equal sized portions, the inlet portion of which is imperforate and the outlet portion of which is circumferentially perforated, a lint receiving casing surrounding the perforated portion of the cylindrical shell and into which said perforations establish communication with the interior of the cylindrical stationary shell, a scouring shell rotatably mounted within the entire cylindrical stationary shell longitudinally and concentrically thereof, and spirally arranged projections and grooves forming an opposed abrasive surface upon the rotating shell carried by said rotating shell within the stationary shell.

4. A cotton seed delinter comprising a cylindrical casing having an imperforate entrance end portion lined with an abrading material and a perforated exit portion of approximately the same length as the imperforate entrance portion of the casing, a hood located over the perforated portion of the casing and spaced from the same and having a downwardly disposed outlet, said casing having in its side and beyond the perforated portion a valved outlet, a rotatable scouring shell journaled within the casing and traversing the imperforate and also the perforated portion thereof, and an abrasive surface carried thereby upon its periphery and forming a continuous spiral groove.

5. A delinter, having a stationary cylindrical scouring shell, the forward portion of which is provided with an inlet and is imperforate, and the rear portion of which is perforated to a point near its outlet end, the said outlet end portion being imperforate and provided with a feed outlet in communication with the cylinder, and at right angles to the inlet at the other end thereof, the imperforate portion of the shell being lined with an abrasive material, a lint receiving chamber surrounding only the perforated portion of the shell between the imperforated ends thereof, and a rotating scouring shell disposed within the stationary shell the full length thereof.

In testimony that I claim the foregoing as my own, I have hereto affixed my signature in the presence of two witnesses.

CHARLES H. GOLLOHER.

Witnesses:
O. P. McPherson,
M. Cannon.